United States Patent
Lundberg

(10) Patent No.: US 7,735,636 B2
(45) Date of Patent: Jun. 15, 2010

(54) ARRANGEMENT AND METHOD FOR ADJUSTMENT OF RAIL AT A CONVEYOR

(75) Inventor: Hakon Lundberg, Savedalen (SE)

(73) Assignee: FlexLink Components AB, Göteborg (SE)

( * ) Notice: Subject to any disclaimer, the term of this patent is extended or adjusted under 35 U.S.C. 154(b) by 319 days.

(21) Appl. No.: 11/579,287

(22) PCT Filed: May 26, 2005

(86) PCT No.: PCT/SE2005/000784

§ 371 (c)(1),
(2), (4) Date: Sep. 28, 2007

(87) PCT Pub. No.: WO2005/118437

PCT Pub. Date: Dec. 15, 2005

(65) Prior Publication Data

US 2008/0156621 A1    Jul. 3, 2008

(30) Foreign Application Priority Data

Jun. 1, 2004   (SE)   .................................. 0401426

(51) Int. Cl.
B65G 21/20   (2006.01)
B65G 17/00   (2006.01)
B65G 15/00   (2006.01)

(52) U.S. Cl. ................. 198/836.1; 198/836.3; 198/817; 198/465.4

(58) Field of Classification Search .............. 198/836.3, 198/836.1
See application file for complete search history.

(56) References Cited

U.S. PATENT DOCUMENTS

| 2,425,158 | A | * | 8/1947 | Masich ........................ 198/599 |
| 4,741,195 | A | * | 5/1988 | Arai et al. ...................... 72/421 |
| 5,211,280 | A | | 5/1993 | Houde |
| 5,291,988 | A | | 3/1994 | Leonard |
| 6,050,396 | A | | 4/2000 | Moore |
| 6,244,429 | B1 | * | 6/2001 | Drewitz et al. ........... 198/836.3 |
| 6,305,528 | B1 | | 10/2001 | Leonard |
| 6,827,203 | B2 | * | 12/2004 | Andreoli et al. .......... 198/836.3 |
| 2007/0017783 | A1 | * | 1/2007 | Kwasniewicz .............. 198/751 |
| 2007/0114112 | A1 | * | 5/2007 | Guenther .................. 198/836.3 |

FOREIGN PATENT DOCUMENTS

| DE | 19610936 A1 | 9/1996 |
| EP | 1331182 A1 | 7/2003 |
| WO | WO 00/10991 | 3/2000 |
| WO | WO-00/17073 A1 | 3/2000 |

OTHER PUBLICATIONS

"International Search Report for Application No. PCT/SE 2005/000784, Date mailed Aug. 29, 2005", 3 Pages.

* cited by examiner

*Primary Examiner*—Gene Crawford
*Assistant Examiner*—Yolanda Cumbess
(74) *Attorney, Agent, or Firm*—Schwegman, Lundberg & Woessner, P.A.

(57) ABSTRACT

An arrangement and a method for guide rail adjustment on a conveyor, the arrangement comprising a set of guide rails, a set of mounting elements, which each support at least one moveably suspended guide rail, and means for simultaneous individual adjustment of said set of mounting elements, the means permitting simultaneous adjustment of the position of the guide rails moveably supported by the mounting elements.

8 Claims, 2 Drawing Sheets

ARRANGEMENT AND METHOD FOR ADJUSTMENT OF RAIL AT A CONVEYOR

RELATED APPLICATIONS

This application is a nationalization under 35 U.S.C. 371 of PCT/SE2005/000784, filed May 26, 2005 and published as WO 2005/118437 A1 on Dec. 15, 2005, which claimed priority under U.S.C. 119 to Swedish Application No. 0401426-2, filed Jun. 1, 2004, which applications and publication are incorporated herein by reference and made a part hereof.

FIELD OF THE INVENTION

The present invention relates to an arrangement for guide rail adjustment on a conveyor according to the preamble of claim 1, and to a method for guide rail adjustment on a conveyor according to the preamble of claim 8. It relates in particular to an arrangement which will facilitate adjustment of the position of a guide rail arranged on a conveyor. The invention may be used in adjusting the height of a guide rail and in adjusting the lateral position of a guide rail in relation to the conveyor.

DESCRIPTION OF THE PRIOR ART

When conveying articles in general, and particularly when conveying articles which are of an unstable shape and which can therefore easily tip over or slip sideways, it is necessary to ensure that the article is stabilized by guide rails. One sphere of application in which the position of support rails is particularly important is when conveying empty plastic bottles along a conveyor. Empty plastic bottles are very light and are therefore affected to a high degree by the air resistance that occurs when conveying at high speeds. There is a great risk, especially in cases where, for design reasons, the base surface of the bottles is designed with a small diameter in relation to the height of the bottle, that the bottle will tip over, resulting in production stoppages. There are number of known arrangements which enable bottles or other products to be well supported by guide rails along the conveyor.

In order to ensure that a conveyor can be used by a number of different products of various dimensions when running over different sections, the guide rails are usually designed to be adjustable for setting various width and/or height positions. A common way of providing this adjustment facility is to support the guide rails on a guide, which is mechanically locked by way of locking members in a mount. By releasing the locking member, the guide rail can be manually moved in the direction of the guide.

One problem with manual adjustment is that the adjustment process is time-consuming. A production line for filling plastic bottles can commonly be up to 100 meters long, or more, which may mean that approximately 150 manual guide rail mounts have to be adjusted when changing the product that is to be conveyed on the conveyor. There is therefore a need to automate the adjustment procedure.

The documents U.S. Pat. No. 5,211,280, U.S. Pat. No. 5,291,988 and WO 00/17073 describe arrangements for guide rail adjustments on conveyors, in which the simultaneous adjustment of a set of guide rail mounts is achieved in that the positions of a rotatable operating member for each guide rail mount are moved in concert in that they are coupled together by way of a torsionally stiff shaft. In U.S. Pat. No. 5,211,280 and U.S. Pat. No. 5,291,988, the torsionally stiff shaft comprises a cardan shaft in order to permit a curved conveyor layout. In WO 00/17073, a flexible shaft is used where the arrangement is to be used for a curved conveyor. One of the disadvantages of this type of arrangement is that adjustment of different guide rail mounts is complicated on curved conveyors. Where cardan shafts are used, as have been proposed in U.S. Pat. No. 5,211,280 and U.S. Pat. No. 5,291,988, there is a risk of too much play between the various parts of the shafts, so that the adjustment becomes different for different guide rail mounts on the same conveyor. Furthermore, an angle of rotation is not transmitted over a cardan joint in such a way that an input angle of rotation always corresponds to the same output angle of rotation. An input angle of rotation of 360° naturally always corresponds to an output angle of rotation of 360°, but within the revolution variations will occur unless very special and therefore expensive cardan joints are used. Where a flexible shaft is used, as has been proposed in WO 00/17073, there is a risk that the shaft will also be torsionally flexible, with the result that the adjustment will become different for different guide rail mounts on one and the same conveyor. Where the flexibility is instead achieved by joining together a number of rigid elements, the same problem as with cardan shafts will occur, with the risk of too much play between the elements or the fact that the reproduction of the angle is not identical over the joint connecting the parts together.

A further example of a system for automatic adjustment of the position of a guide rail on a conveyor is given in the U.S. Pat. No. 6,305,528. The document describes a support arrangement which has a guide rail, which is supported by a guide, which is displaceably arranged in a mount. The guide rail can be moved by means of a pressurized cylinder between two adjustable positions. The adjustment is performed in that a hydraulic oil limits the stroke length of a cylinder. Compressed air presses a piston, arranged inside the cylinder, against the included oil. The compressed air serves as a spring, which presses the piston against the oil. The cylinder cannot actively assume a position corresponding to the fully contracted position, which means that the arrangement allows two positions to be set through adjustment of the quantity of oil supplied to the cylinder in its two fixed volume positions. Since oil is used as resistance medium for adjustment of the piston position and the piston is applied against a confined volume of oil by means of compressed air, due to leakage air will pass to the oil side and become mixed with the oil. This means that the oil-air mixture will become compressible, with the result that stable adjustment of fixed guide rail positions is rendered impossible. The design also requires the use of an incompressible pressure medium. This is a disadvantage where the arrangement is to be used in the food industry, where the leakage of hydraulic oils is undesirable.

There is also an example of an arrangement for guide rail adjustment on a conveyor according to the preamble of claim 1 specified in the document EP 1331182. In this case, the means for simultaneous adjustment of a set of guide rail mounts consists of a control cable of the Bowden type. The solution proposed in the document EP 1331182 presents the problem that the control cable can become locked, with the result that the adjustment becomes different for different guide rail mounts on one and the same conveyor. In addition, there are relatively tight restrictions with regard to the maximum radius of curvature of a control cable of the Bowden type. Should the cable be bent too much, the risk of the cable locking is dramatically increased. This means that the cables must hang relatively freely, with the result that they take up a lot of space. This also increases the risk of somebody or something getting caught in the cables, with the risk of a cable breaking.

SUMMARY OF THE INVENTION

An object of the invention is to provide an arrangement for guide rail adjustment on a conveyor which solves the aforementioned problems with previously known arrangements for guide rail adjustments. A further object of the invention is to provide an arrangement for guide rail adjustment on a conveyor which is easy to fit and which provides for a simultaneous adjustment of the position of number of guide rails with a high degree of precision.

This object is achieved by an arrangement for guide rail adjustment on a conveyor according to the characterizing part of claim 1. According to the invention use is made of said means for the simultaneous adjustment of said set of mounting elements, which comprises a set of synchronous or stepping motors, which are fed from a common voltage source. Each mounting element supports at least one moveably supported guide rail. The position of the guide rail is controlled by the synchronous or stepping motor. For a set of synchronous or stepping motors fed by a common feed voltage, all motors in the set are driven to rotate by an equal number of revolutions or parts of a revolution over a specific on-time, the number of revolutions depending on the on-time of the feed voltage. In a preferred embodiment a set of synchronous motors is used. The rotation of a synchronous motor is controlled entirely by the frequency at which the motor is fed. Supplying a set of synchronous motors from a common voltage source means that all synchronous motors are driven at the same rotational speed on an output shaft of the synchronous motors. By applying the feed voltage for a specific common period of time, the synchronous motors are driven to rotate for an equal number of revolutions or parts of a revolution.

The rotational motion of the synchronous motors is translated into a linear motion of the moveably supported guide rails, making it possible to ensure that the guide rails are moved an equal distance.

According to a preferred embodiment, the mounting element comprises means of translating the rotational motion of the synchronous motors into a linear motion of at least one moveably supported guide rail arranged on each mounting element. The means of translating the rotational motion of the synchronous motors into a linear motion furthermore preferably comprises an externally threaded rod engaging with an internally threaded cylinder arranged on a guide rail mount, the rotation of said rod being translated into a linear motion of the guide rail mount.

The threaded rod may advantageously have two opposite-handed threads on each part of the rod engaging with each internally threaded cylinder arranged on each guide rail mount, so that rotation of said rod is translated into a linear motion in opposite directions in relation to each of the two guide rail mounts.

The common voltage source is preferably designed to deliver a feed voltage with a first phase for driving the synchronous motors in a first direction of rotation and to deliver a feed voltage with a second phase in order to drive the synchronous motors in a second direction of rotation.

According to a preferred embodiment the mounting elements comprise a stop device designed to mechanically prevent movement of a moveable guide rail arranged in the mounting element, said means for simultaneous individual adjustment of said set of mounting elements being designed to simultaneously calibrate the adjustment of all moveably arranged guide rails by moving all guide rails into contact with said stop devices.

According to an alternatively preferred embodiment the mounting elements comprise two moveably suspended guide rails and said means for simultaneous individual adjustment of said set of mounting elements is designed to simultaneously calibrate the adjustment of the guide rails supported by the mounting elements by, for each mounting element, moving the two moveably supported guide rails towards one another until they come into contact with one another, preventing any further movement.

Both of these embodiments rely on the fact that a synchronous motor increases the torque delivered until the motor can no longer turn. When the motor is no longer able to turn the motor stops without sustaining any damage. The fact that all motors are brought to a standstill when the guide rails are driven against a common reference stop therefore means that the adjustment of the guide rails is calibrated throughout the entire set of mounting elements. When the motors are then driven in the opposite direction, the guide rails retain their calibration and the movement varies only as a function of how long the motors are run. The operating time is the same for all the motors, so that the positions of all guide rails accurately remain the same.

The fact that a synchronous motor stops when it is overloaded can also be used to provide an arrangement for adjusting the position of a set of guide rails, in which the risk of injury to persons or damage to objects due to jamming is reduced. By selecting a synchronous motor and a transmission between synchronous motor and guide rail which ensures that the synchronous motor stops at a suitably low jamming force, a safe and functional arrangement is obtained.

The invention also relates to a method for guide rail adjustment having the aforementioned advantages.

BRIEF DESCRIPTION OF THE DRAWINGS

The invention will be described in more detail below with reference to the drawings attached, in which.

DETAILED DESCRIPTION OF THE PREFERRED EMBODIMENTS

Figure 1:
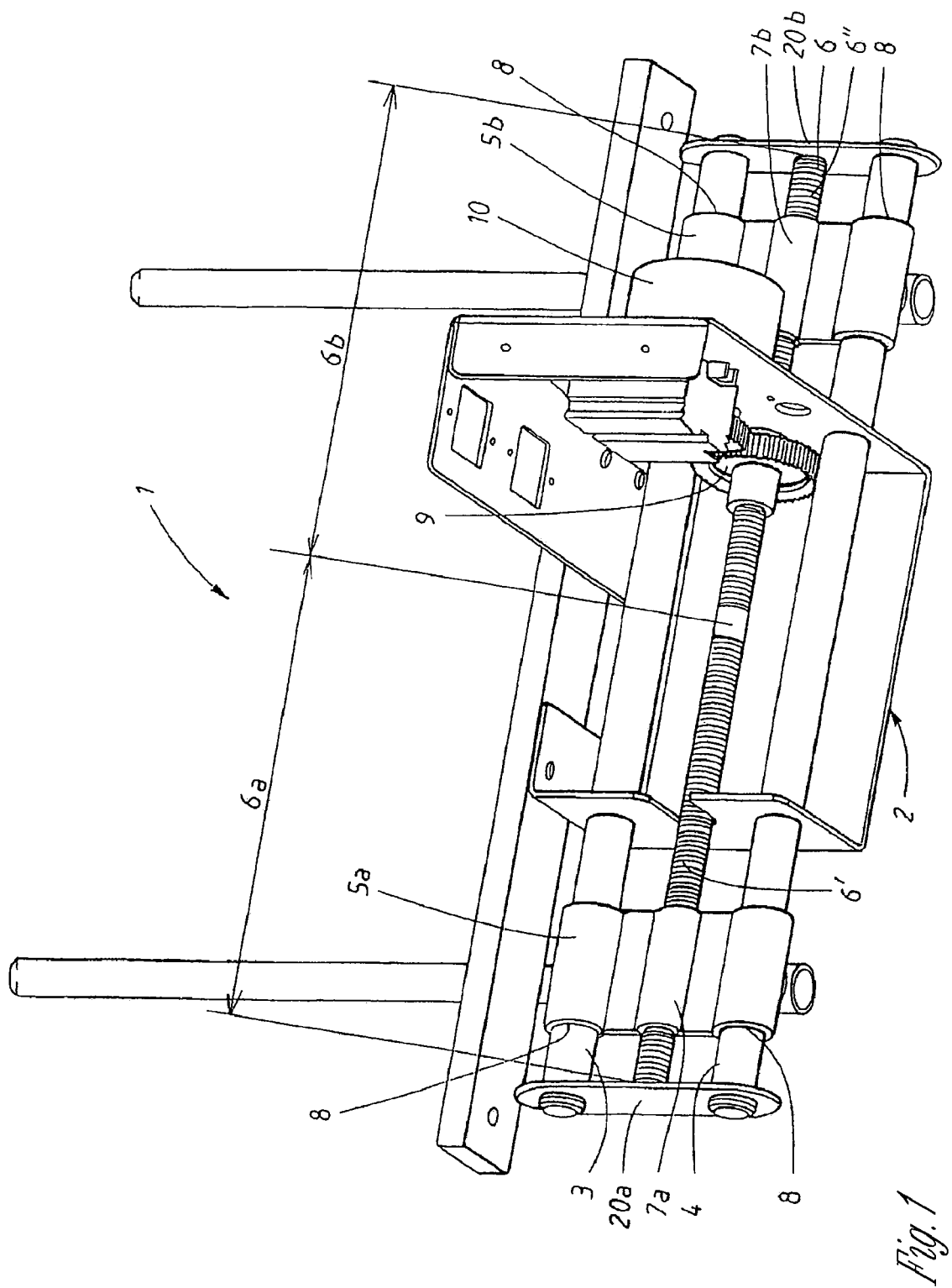
FIG. 1 shows a mounting element for an arrangement for guide rail adjustment according to the invention.

FIG. 1 shows a mounting element 1, which is designed to support two moveably suspended guide rails. The mounting element 1 comprises a housing 2, in which slide rails 3, 4 are arranged in order to support a first and a second guide rail mount 5*a*, 5*b*. A threaded rod 6 is also rotatably supported in the mounting element. The rod 6 has an external thread with a screw thread 6' on one half 6*a* of the rod and an opposite-handed screw thread 6" on its other half 6*b*. The guide rail mounts 5*a*, 5*b* both have an internally threaded cylinder 7*a*, 7*b*, the cylinders being designed to engage with the threaded rod 6. The guide rail mounts furthermore have recesses 8 designed, through interaction with the slide rails 3, 4, to support the guide rail mounts 5*a*, 5*b*. The guide rail mounts 5*a*, 5*b* also have a support to which the guide rail (not shown) is subsequently fixed.

A gear wheel 9 is fixed on the rod 6. The gear wheel is driven by a synchronous motor 10. The gear wheel 9 may be driven directly by a toothed gear rim fitted to the output shaft of the synchronous motor, or alternatively by an intermediate gear. By forming the thread on the rod 6 with a sufficiently small pitch, for example an M10 thread, the guide rail mounts can be designed to be self-locking, so that the guide rail cannot be moved by the guide rail mounts being pressed against one another. The guide rails can then be moved only by rotation of the motor. The mounting element can furthermore be equipped with a stop device 20a, 20b, which limits the movement of the guide rail mount.

Figure 2:
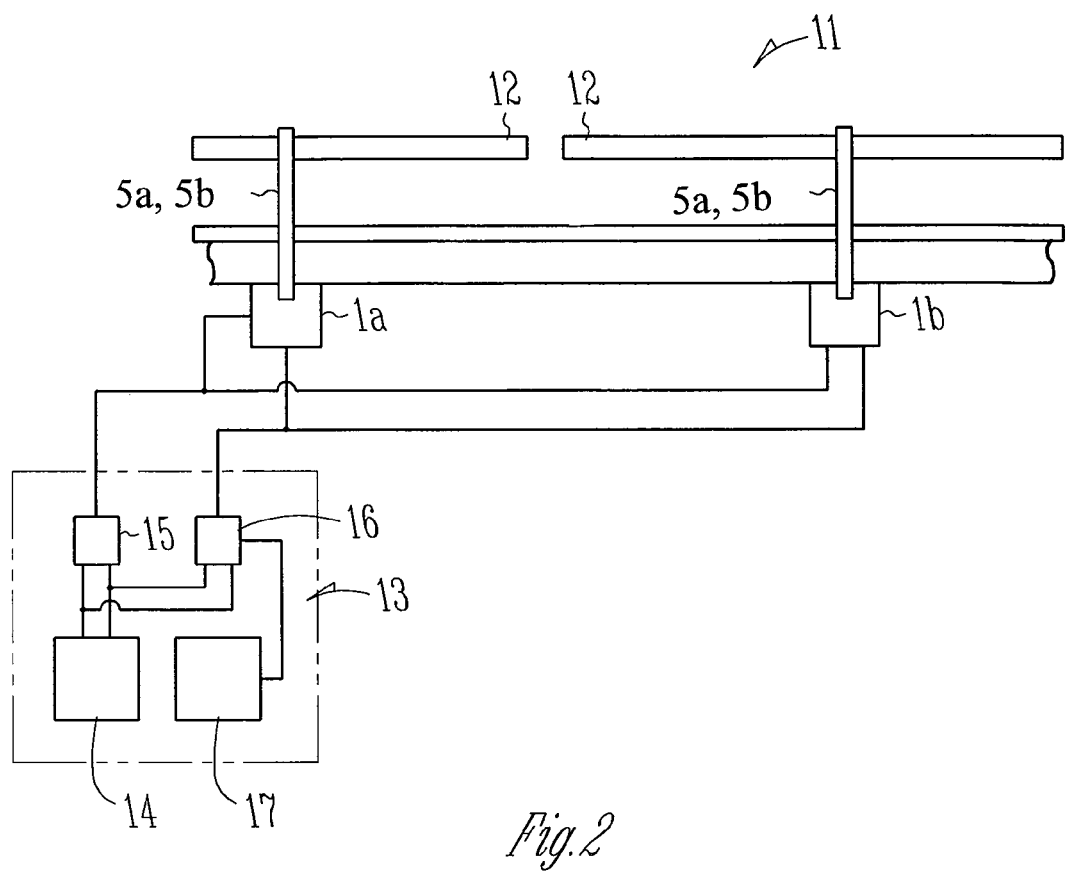
FIG. 2 shows an arrangement for guide rail adjustment according to the invention.

FIG. 2 shows an arrangement 11 for guide rail adjustment according to the invention. The arrangement comprises a set of guide rails 12, a set of mounting elements 1a, 1b, each mounting element 1a and 1b including a first guide rail mount 5a and a second guide rail mount 5b, which each support at least one moveably suspended guide rail. The set of guide rails 12 may be discontinuous as shown in the figure, or may comprise a single long guide rail, the position of which is to be adjusted in a large number of mounting elements 1a, 1b. The mounting element may support just a single moveably suspended guide rail, or two guide rails, which may advantageously be arranged with a mounting element as has been shown in FIG. 1. The arrangement 11 further comprises means 13 for simultaneous individual adjustment of said set of mounting elements. The means 13 for simultaneous individual adjustment of said set of mounting elements comprises a synchronous motor 10 provided for each mounting element in said set of mounting elements 1. The synchronous motors 10 are driven by a common voltage source 14. The voltage source 14 may be designed, via two transformers 15, 16, to deliver an alternating current voltage having a first phase and a second phase, the synchronous motor being driven in either direction depending on which phase is applied to the synchronous motors 10. A control circuit 17 is furthermore connected to the means for simultaneous individual adjustment. The control circuit may be of a simple type and may just comprise control buttons for the forward and return direction, or it may be more advanced with a memory function in which preset positions can be stored. The means for simultaneous individual adjustment further comprises feed cables 18 for the voltage supply to the synchronous motors 10.

The synchronous motors consist of conventional synchronous motors which will be familiar to a person skilled in the art, for which reason their function and construction will not be described in more detail.

Simultaneous individual adjustment of a set of mounting elements means that the mounting elements are adjusted individually, that is to say with no mechanical coupling between one another, and that the adjustment is performed simultaneously for all mounting elements included in the set.

Figure 3:
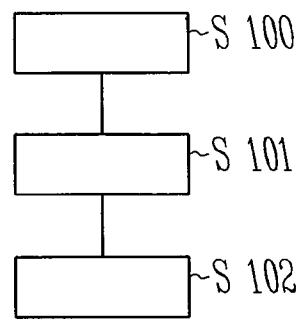
FIG. 3 shows a schematic representation of a method for guide rail adjustment according to the invention.

FIG. 3 shows a schematic representation of a method for guide rail adjustment on a conveyor of the aforesaid type.

In a first step S100 of the method, a feed voltage is applied to all synchronous motors in said set of synchronous motors, the moveable guide rails being moved simultaneously at a common speed.

The magnitude of the movement can be controlled manually or automatically. For example, the magnitude of the movement can be monitored by measuring the time for which the synchronous motor drives the movement. Another alternative may be to measure the number of revolutions for which the synchronous motor rotates. In further alternative embodiments, position sensors can be used, although the arrangement can advantageously be used without position sensors, since the arrangement can be very easily calibrated and the magnitude of the movement can be calculated very precisely from input data on how long the synchronous motor has been in operation.

According to a preferred embodiment of the invention, the position of the guide rails can be calibrated by undertaking the following further steps:

In a step S101 of the method, a feed voltage is applied to all synchronous motors in said set of synchronous motors, simultaneously bringing about the movement of the moveable guide rails toward a stop position situated on each mounting element.

In a further step S102 a feed voltage continues to be supplied to said synchronous motors, the guide rails being braked at the stop position and held for a period of time, said means for simultaneous adjustment of said set of mounting elements ensuring that the position of all moveable guide rails has been calibrated.

The invention must not be limited to the embodiments specified above. In particular, mounting elements with just one moveably suspended guide rail may be used.

The means of translating the rotational motion of the synchronous motor into a linear motion of at least one moveably supported guide rail arranged on each mounting element may be of a type other than the combination of gearwheel and threaded rod as described in connection with FIG. 1.

The term set of motors is taken to mean a group of motors comprising at least two motors. Within the group, that is to say the set, the motors must be of identical design so that the rotational speed on the output shaft is identical for all motors when they are fed by a common feed voltage. Along a conveyor, multiple different sets of motors may be used for different parts of the conveyor. For example, a first set may be used on a curved part, a second set on a straight part of the conveyor which runs into the curved part and a third set may be used for a straight part of the conveyor which leads out from the curved part. This solution allows the guide rail mounts to be adjusted separately for the curve and for the incoming and outgoing straight parts of the conveyor. This may be necessary where articles having a cross-section other than a circular one are being conveyed, since the width of the article conveyed will depend on where the article is placed on the conveyor. The necessary width of the conveyor is then different in the curve and before and after the curve. If the article is not turned in the curve so that the article occupies the same position in relation to the conveyor, the necessary width before and after the curve will not be the same.

The invention claimed is:

1. An arrangement for guide rail adjustment on a conveyor, the arrangement comprising:
    at least one set of guide rails,
    a plurality of sets of mounting elements, which each support at least one moveably suspended guide rail, and
    means for simultaneous individual adjustment of said sets of mounting elements, the means permitting simultaneous adjustment of the position of the guide rails moveably supported by the mounting elements, wherein said means for simultaneous adjustment of said plurality of sets of mounting elements comprises a plurality of synchronous or stepping motors, which are fed from a common voltage source;
    wherein at least one of the sets of mounting elements comprises a translator to translate the rotational motion of the synchronous or stepping motor into a linear motion of at least one moveably supported guide rail arranged on each mounting element,
    the translator comprises an externally threaded rod engaging with an internally threaded cylinder arranged on a guide rail mount, the rotation of said rod being translated into a linear motion of the guide rail mount, wherein said rod has a first portion having a screw thread turning in one direction and a second portion having an opposite-handed screw thread and that each portion engages with each internally threaded cylinder arranged on each guide rail mount, the rotation of said rod being translated into a linear motion of the two guide rail mounts in opposite directions to one another, and wherein said common voltage source is to deliver a first feed voltage with a first phase for driving the synchronous or stepping motors in a first direction of rotation and to deliver a second feed voltage with a second phase to drive the synchronous or stepping motors in a second direction of rotation.

2. The arrangement as claimed in claim 1, wherein each mounting element in said set of mounting elements comprises a stop device designed to mechanically prevent movement of a moveable guide rail arranged in the mounting element, said means for simultaneous individual adjustment of said set of mounting elements being designed to simultaneously calibrate the adjustment of all moveably arranged guide rails by moving all guide rails into contact with said stop devices.

3. The arrangement as claimed in claim 2, wherein each mounting element in said set of mounting elements has two moveably suspended guide rails and wherein said means for simultaneous individual adjustment of said set of mounting elements is to simultaneously calibrate the adjustment of the guide rails supported by the mounting elements by, for each mounting element, moving the two moveably supported guide rails toward one another until they come into contact with one another, preventing any further movement.

4. A method for guide rail adjustment in an arrangement for guide rail adjustment on a conveyor, the arrangement comprising:
at least one set of guide rails,
a plurality of sets of mounting elements, which each support at least one moveably suspended guide rail, and
means for simultaneous individual adjustment of said sets of mounting elements, the means permitting simultaneous adjustment of the position of the guide rails moveably supported by the mounting elements, in which said means for simultaneous adjustment of said plurality of sets of mounting elements comprises a plurality of synchronous or stepping motors, which are fed from a common voltage source, the method comprises applying a feed voltage to all synchronous or stepping motors in said set of synchronous or stepping motors, the moveable guide rails being moved simultaneously at a common speed;
wherein simultaneous calibration of the adjustment of all moveably arranged guide rails supported by said mounting elements is performed through the following steps:
applying the feed voltage to all synchronous or stepping motors in said set of synchronous or stepping motors, simultaneously bringing about the movement of the moveable guide rails towards a stop position situated on each mounting element,
continuing to apply the feed voltage to said synchronous or stepping motors, the guide rails being braked at a stop position and held for a period of time, said means for simultaneous adjustment of said set of mounting elements ensuring that the position of all moveable guide rails has been calibrated, wherein each mounting element in said set of mounting elements comprises a stop device designed to mechanically prevent movement of a moveable guide rail arranged in the mounting element, said means for simultaneous individual adjustment of said set of mounting elements simultaneously calibrating the adjustment of all moveably arranged guide rails by moving all guide rails into contact with said stop devices.

5. The method as claimed in claim 4, wherein each mounting element in said set of mounting elements has two moveably suspended guide rails and that said means for simultaneous individual adjustment of said set of mounting elements simultaneously calibrates the adjustment of the guide rails supported by the mounting elements by, for each mounting element, moving the two moveably supported guide rails towards one another until they come into contact with one another, preventing any further movement.

6. A conveyor guide rail, comprising:
at least one set of guide rails,
a plurality of sets of mounting elements to moveably support the sets of guide rails, and
an adjuster comprising a set of motors, which are fed from a common voltage source, operably connected to the plurality of sets of mounting elements, and selected from a group consisting of a synchronous motor, the adjuster to permit simultaneous adjustment of a position of the at least one set of guide rails moveably supported by the mounting elements;
wherein said common voltage source is to deliver a first feed voltage with a first phase for driving the set of motors in a first direction of rotation and to deliver a second feed voltage with a second phase to drive the set of motors in a second direction of rotation.

7. The conveyor guide rail of claim 6, wherein at least one of the sets of mounting elements comprises a translator to translate the rotational motion of the set of motors into a linear motion of at least one moveably supported guide rail arranged on each mounting element, and wherein the translator comprises internally threaded cylinder, an externally threaded rod engaging with the internally threaded cylinder, the rotation of the rod being translated into linear motion of the mounting element.

8. The conveyor guide rail of claim 7, wherein the rod has a first portion with a thread turning in one direction and a second portion with an opposite-handed thread, and wherein the first portion and the second portion each engage a respective one of the internally threaded cylinders arranged on a respective mounting element, the rotation of the rod being translated into a linear motion of two mounting elements in opposite directions to one another.

* * * * *